(12) United States Patent
Karlicek et al.

(10) Patent No.: US 10,873,396 B2
(45) Date of Patent: Dec. 22, 2020

(54) METHODS AND DEVICES FOR TRANSCEIVING LIGHT VIA A DISPLAY DEVICE

(71) Applicant: RENSSELAER POLYTECHNIC INSTITUTE, Troy, NY (US)

(72) Inventors: Robert F. Karlicek, Mechanicville, NY (US); Bassem Fahs, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 16/347,672

(22) PCT Filed: Dec. 5, 2017

(86) PCT No.: PCT/US2017/064650
§ 371 (c)(1),
(2) Date: May 6, 2019

(87) PCT Pub. No.: WO2018/106655
PCT Pub. Date: Jun. 14, 2018

(65) Prior Publication Data
US 2019/0280771 A1    Sep. 12, 2019

Related U.S. Application Data

(60) Provisional application No. 62/429,921, filed on Dec. 5, 2016.

(51) Int. Cl.
*H04B 10/00* (2013.01)
*H04B 10/116* (2013.01)
(Continued)

(52) U.S. Cl.
CPC ............ *H04B 10/116* (2013.01); *G09G 3/32* (2013.01); *G09G 3/3208* (2013.01); *H04B 10/40* (2013.01); *H04B 10/502* (2013.01); *H04L 5/14* (2013.01)

(58) Field of Classification Search
CPC ...... H04B 10/116; H04B 10/40; H04B 10/11; H04B 10/112; H04B 10/114;
(Continued)

(56) References Cited

U.S. PATENT DOCUMENTS 7,450,085 B2    11/2008  Thielemans et al.
8,565,612 B2 *  10/2013  Kim ..................... H04B 10/116
                                                        398/127

(Continued)

OTHER PUBLICATIONS

International Search Report and the Written Opinion, International Patent Application No. PCT/US2017/064650, dated Mar. 6, 2018.

*Primary Examiner* — Hanh Phan
(74) *Attorney, Agent, or Firm* — Murtha Cullina LLP; Anthony P. Gangemi (57) ABSTRACT

Methods and devices including a light display transceiver device are disclosed. Disclosed methods and devices include a light source array including at least one pixel unit, the at least one pixel unit including one of a single pixel, a plurality of groups of cooperating single pixels, a combination of singles pixels and groups of cooperating single pixels, and a single group of cooperating single pixels. Control wires are joined with each of the at least one pixel units. A controller is joined with the control wires for controlling each of the at least one pixel unit. The light source array is configured to operate in at least one of three modes, a full-space-division-duplex (FSDD) mode, a half-space-division-duplex (HSDD) mode, and a time-division-duplex (TDD) mode. The controller causes the light source array to operate in one of the three modes.

19 Claims, 12 Drawing Sheets

(51) Int. Cl.
*G09G 3/32* (2016.01)
*G09G 3/3208* (2016.01)
*H04B 10/40* (2013.01)
*H04B 10/50* (2013.01)
*H04L 5/14* (2006.01)

(58) Field of Classification Search
CPC ............ H04B 10/1143; H04B 10/1149; H04B 10/1123; G09G 3/3688; G09G 3/3648; G09G 3/3696; G09G 3/3406; G09G 3/3426
USPC ....... 398/172, 118, 119, 127, 128, 130, 131, 398/135, 136; 345/87, 76, 207, 211, 690
See application file for complete search history.

(56) References Cited

U.S. PATENT DOCUMENTS

| | | | |
|---|---|---|---|
| 8,971,716 B2* | 3/2015 | Kang | H04B 10/116 398/118 |
| 2010/0073344 A1* | 3/2010 | Ohhashi | C23C 16/401 345/211 |
| 2010/0134523 A1 | 6/2010 | Lebrun et al. | |
| 2011/0007048 A1 | 1/2011 | Fratti et al. | |
| 2011/0032232 A1 | 2/2011 | Smith | |

\* cited by examiner

METHODS AND DEVICES FOR TRANSCEIVING LIGHT VIA A DISPLAY DEVICE

CROSS REFERENCE TO RELATED APPLICATION(S)

This application claims the benefit of U.S. Provisional Application No. 62/429,921, filed Dec. 5, 2016, which is incorporated by reference as if disclosed herein in its entirety.

BACKGROUND

The utility of having a display device with visible light communication (VLC) functionality is readily understood. However, because each pixel in a light emitting diode (LED) display must be controlled, both physical space requirements related to the need for control wires joined with each pixel or LED and then number of transistors in each pixel or LED are often problematic. Existing LED displays that incorporate VLC either suffer from poor battery lifetime or cannot be packaged in a compact housing.

SUMMARY

Some embodiments of the disclosed subject matter include a light display transceiver device according to the following: a light source array including at least one pixel unit, the at least one pixel unit including one of a single pixel, a plurality of groups of cooperating single pixels, a combination of singles pixels and groups of cooperating single pixels, and a single group of cooperating single pixels; control wires joined with each of the at least one pixel units; and a controller joined with the control wires for controlling each of the at least one pixel unit; wherein the light source array is configured to operate in at least one of three modes, a full-space-division-duplex (FSDD) mode, a half-space-division-duplex (HSDD) mode, and a time-division-duplex (TDD) mode and the controller causes the light source array to operate in one of the three modes.

Some embodiments of the disclosed subject matter include a light display transceiver device according to the following: a light source array including rows or columns of cooperating single pixels; control wires joined with each of the rows or columns of cooperating single pixels; and a controller joined with the control wires for controlling each of the rows or columns of cooperating single pixels; wherein the light source array includes at least one of three modes of operation, a full-space-division-duplex (FSDD) mode, a half-space-division-duplex (HSDD) mode, and a time-division-duplex (TDD) mode and the controller causes the light source array to operate in one of the modes.

Some embodiments of the disclosed subject matter include a method of controlling a light source array according to the following: providing a light source array including rows or columns of cooperating single pixels; providing a controller that is in electronic communication with the each of the rows or columns of cooperating single pixels; and separately transmitting control signals from the controller to each of the rows or columns of cooperating single pixels in a predetermined order.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Referring now to FIGS. 1-5, some embodiments of the disclosed subject matter include a light display transceiver device 100 including a light source array 102, which is joined with and controlled by a controller 104 via control wires 106. In some embodiments, light source array 102 is formed from at least one pixel unit 108 that is made up of either single pixels 110, a plurality of groups 112 of cooperating single pixels, a combination of singles pixels and groups of cooperating single pixels, or a single group 114 of cooperating single pixels.

Figure 1:
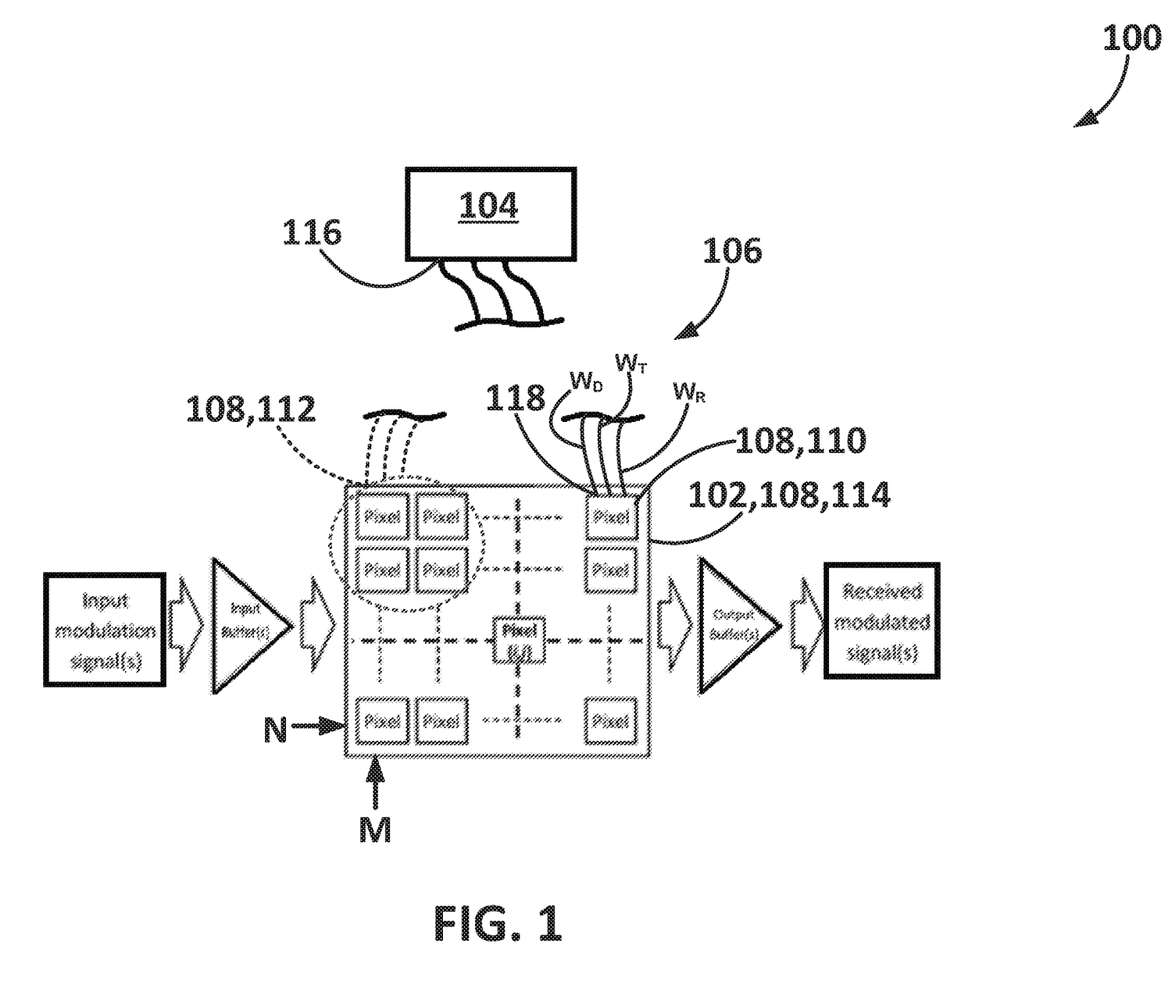
FIG. 1 is a schematic diagram of methods and devices according to some embodiments of the disclosed subject matter.
Figure 2:
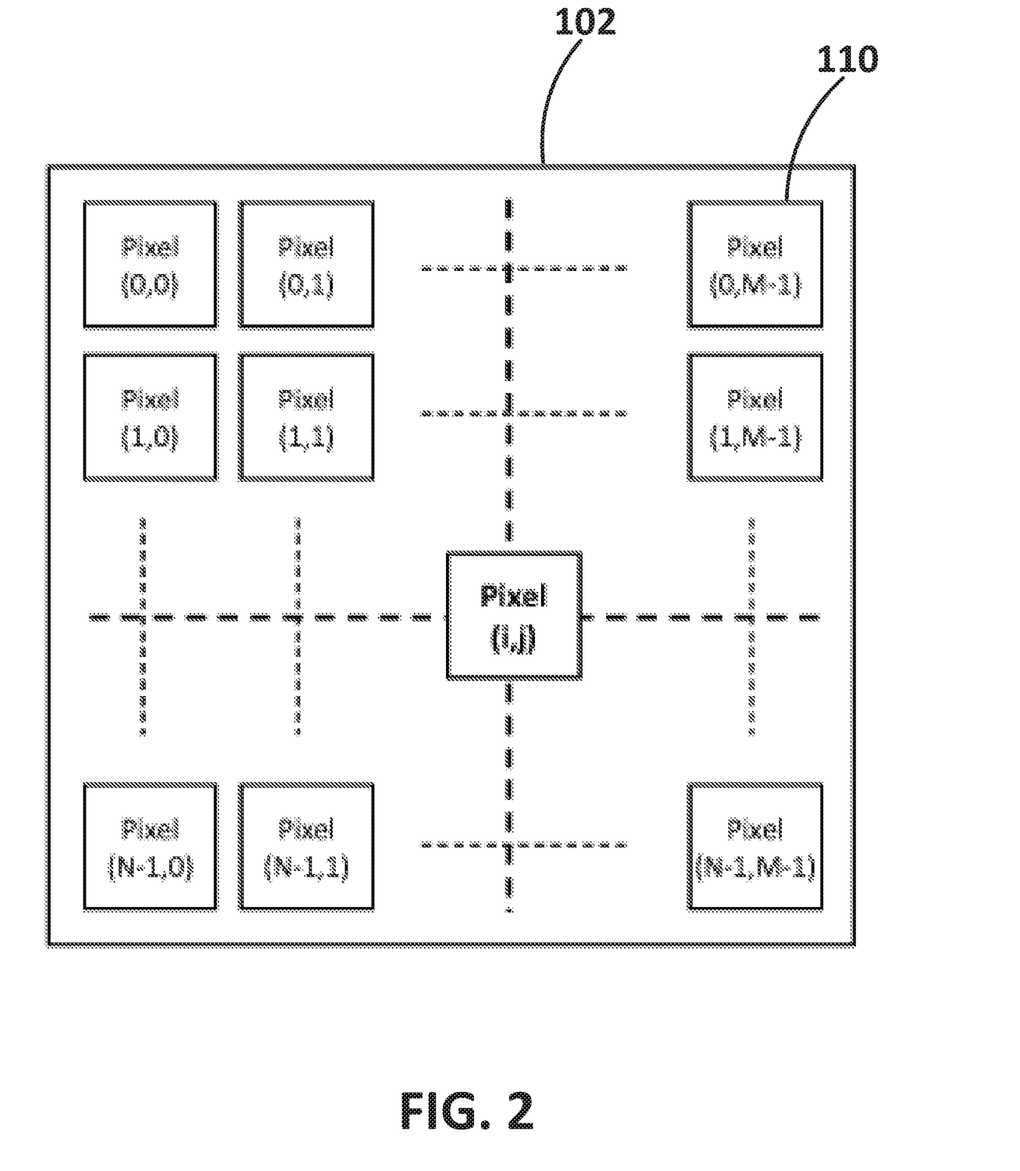
FIG. 2 is a schematic diagram of a light source array according to some embodiments of the disclosed subject matter.

As shown in FIGS. 1 and 2, light source array 102 is defined by a pixel matrix of rows (N) and columns (M). Accordingly, the location of each single pixel 110 within the matrix is designated by the row i, which is an integer between 0 and N−1, and the column j, which is an integer between 0 and M−1.

Each of single pixels 110 is typically a light emitting diode (LED or micro-LED) or an organic light emitting diode (OLED). Light display transceiver device 100 operates as a typical display such as a flat panel LED monitor, a light transmitter for transmitting data via light transmissions from light source array 102, and a receiver for receiving data via the light source array.

Light source array 102 is typically configured to operate in at least one of three modes, a full-space-division-duplex (FSDD) mode, a half-space-division-duplex (HSDD) mode, and a time-division-duplex (TDD) mode. Controller 104 causes light source array 102 to operate in one of the three modes.

In FSDD mode, certain pixels 110 of light source array 102 are set in R mode and receive modulated light in the same time as other pixels are set in D or T modes and are emitting either static or modulated light.

In HSDD, to avoid interference issues in FSDD mode caused by the optical and electrical crosstalk between neighbor pixels as well as the optical effects through the screen glass, e.g., reflection, diffraction, refraction, scattering, etc., the pixels' transmission and receiving time durations are different and synchronized. The pixels set in D and/or T modes are cyclically turned OFF over time periods during which the pixels set in R mode are turned ON, and vice-versa. The ON/OFF switching durations are very short periods, e.g., milliseconds to a few tens of milliseconds, to avoid being perceived by the human eye. In the same time, these ON/OFF switching durations are long enough to support long data-frames transmission without distortion effects on linear signals modulation, such as Orthogonal-Frequency-Division-Multiplexing (OFDM).

TDD mode differs from HSDD mode in that the complete display array is turned either ON (in D/T modes) or OFF (in R mode). Again, the ON/OFF switching durations are very short periods to impair the displayed information quality, and are meanwhile long enough to avoid any data transmission corruption.

Control wires 106 are joined at a first end 116 with controller 104 and at a second end 118 with each of pixel units 108 in light source array 102 and serve as a conduit for relaying a first control signal D from the controller to each of the pixel units including instructions that cause each of the pixel units to operate in a display mode (D mode), a second control signal T from the controller to the pixel units including instructions that cause the pixel units to operate in a transmitter mode (T mode), a third control signal R from the controller to the pixel units including instructions that cause the pixel units to operate in a receiver mode (R mode), or a combination thereof.

The overall design of light display transceiver device 100 is adjusted by modifying either the configuration of light source array 102, the particular design of each LED that forms pixels 110, or a combination of both depending on the particular application of the device. Designs that include a maximum number of control wires 106, e.g., each of single pixels 110 include three control wires $W_D$, $W_T$, $W_R$, for receiving control signals D, T, R from controller 104, are typically not desired as they require an increased array size, add more spacing constraints between the pixels, degrade the inter-cell crosstalk, and augment the parasitic capacitance relative to the control wires carrying modulated signals in transmission or receiver modes.

Referring to FIGS. 1 and 2, light display transceiver device 100 includes a basic array design where is shown where each of single pixels 110 include three control wires $W_D$, $W_T$, $W_R$, for receiving control signals D, T, R from controller 104. The total number of control wires 106 in light display transceiver device 100 is therefore calculated by the following equation (1):

$$\text{number of control wires} = 3MN \quad (1)$$

where 3 is the number of control wires per single pixel 110, N is the number of rows, and M is the number of columns in light source array 102.

Figure 3:
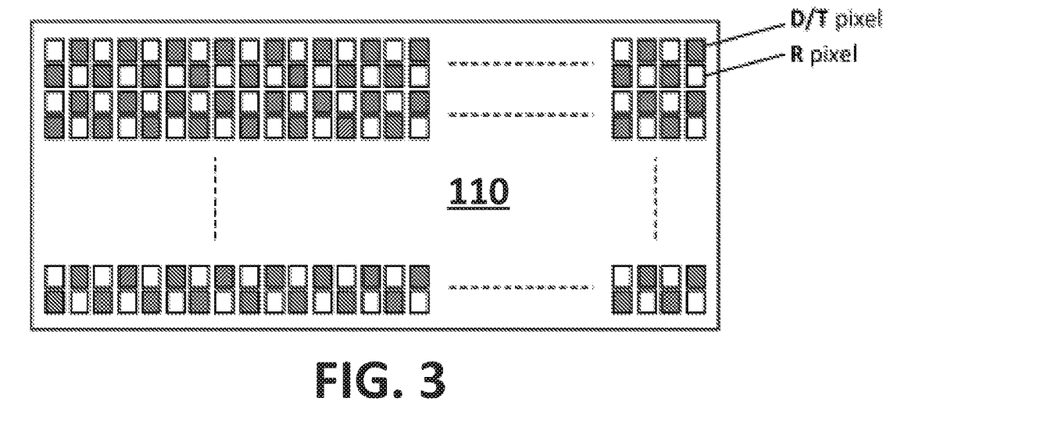
FIG. 3 is a schematic diagram of a light source array according to some embodiments of the disclosed subject matter.
Figure 4:
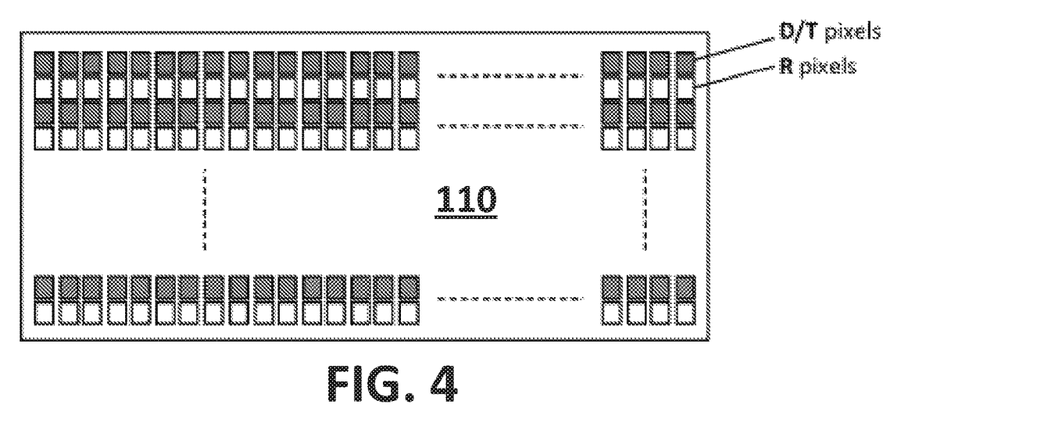
FIG. 4 is a schematic diagram of a light source array according to some embodiments of the disclosed subject matter.
Figure 5:
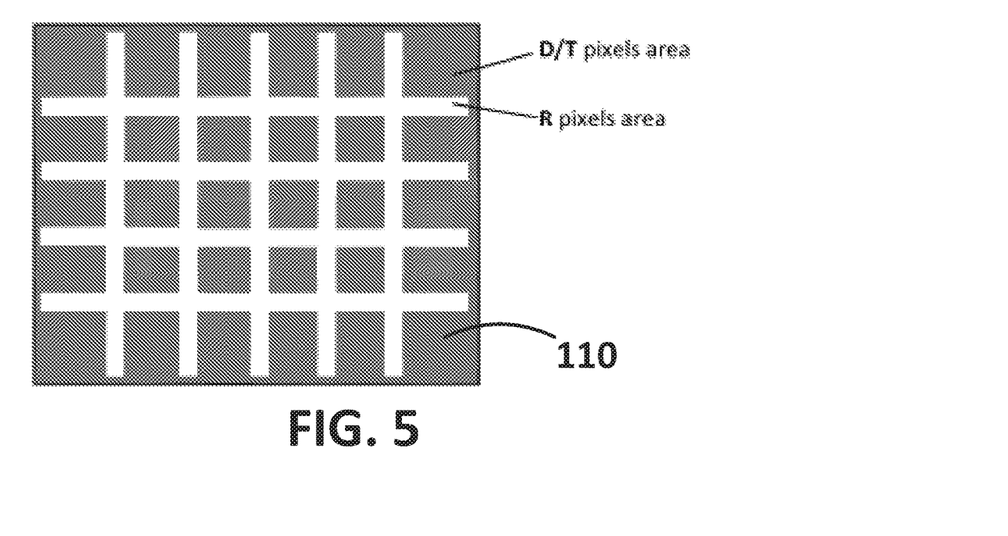
FIG. 5 is a schematic diagram of a light source array according to some embodiments of the disclosed subject matter.

Referring now to FIGS. 3-5, in some embodiments light source array 102 is configured so that includes different arrangements and patterns of pixel units 108 or single pixels 110 where some of the pixels are reserved only for D and T modes and some other pixels are only set in R mode. As shown in FIG. 3, in some embodiments, array pixels 110 are disposed in an interleaved configuration. Alternatively, similar functionality can be achieved with interleaved areas or groups of pixels. As shown in FIG. 4, some embodiments include rows or columns of D/T and R patterns, i.e., pixel units 108 or single pixels 110 that are reserved for emitting light in D or T modes or prevented from emitting light so as to always be in an R mode. In still other embodiments as shown in FIG. 5, groups of pixels 110 are reserved for D/T or R modes. Based on the same approach, myriad configurations of pixels arrangements, areas, shapes, density, size, etc. are contemplated depending on the particular application. Such configurations do not impact the display quality to a user as the granularity level is imperceptible for the human eye. Such configurations halve the number of control wires 106, which can be determined by the following equation (2):

$$\text{number of control wires} = (3/2)MN \quad (2)$$

where 3 is the number of control wires per single pixel 110, N is the number of rows, and M is the number of columns in light source array 102.

In other embodiments (not shown), the number of control wires 106 can be further reduced from the number determined using equation (2) by reserving certain pixels 110 of light source array 102 only for display functionality or use in D mode, some other pixels for dual D and T modes functionality and some other pixels for only R mode.

Figure 6:
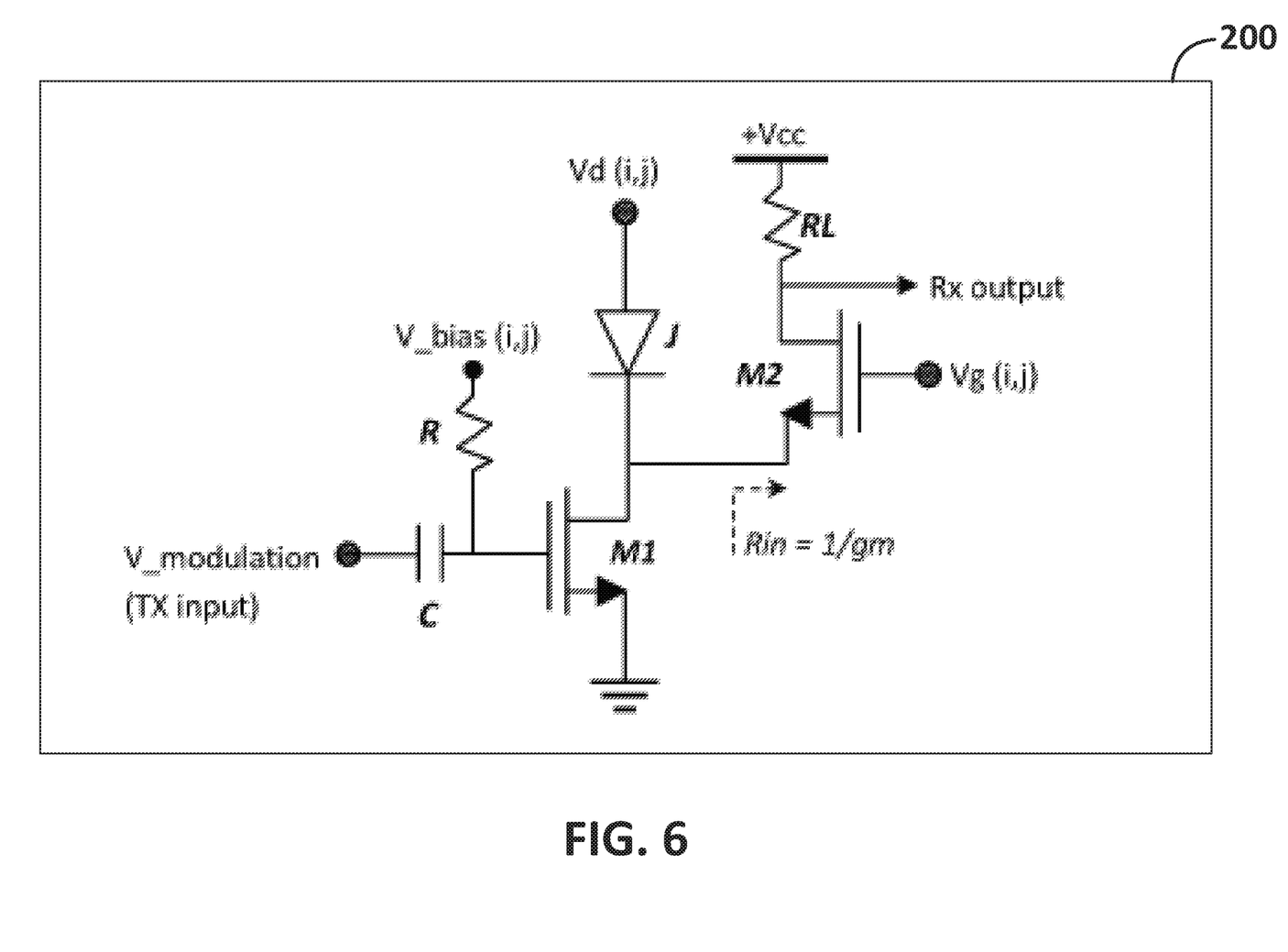
FIG. 6 is a circuit diagram of a pixel LED according to some embodiments of the disclosed subject matter.

As mentioned above, the overall design, e.g., the performance parameters and physical footprint, of light display transceiver device 100 can be adjusted according to a particular application by modifying the particular design of each LED that forms pixels 110. For example, it is typically desirable to utilize LEDs that include a minimum number of transistors. Referring now to FIG. 6, in some embodiments, the LEDs that form each of pixels 110 include a circuit design 200 having a minimum number of transistors, e.g., two transistors, M1 and M2. In some embodiments, transistors M1 and M2 are N-type transistors, P-type transistors, or a combination thereof. LEDs including circuit design 200 can be used in display (D) and transmission (T) modes or as a photodetector in receiver (R) mode.

In display or D mode, a diode J is biased in a forward mode and its anode is set to a high potential level, preferably to a supply voltage (+$V_{cc}$). Transistor M1 is biased to draw a DC current from the diode and have it emit light. The transistor M2 is turned OFF by setting its gate bias $V_{g(i,j)}$ to the ground. In D mode, the modulation input, a modulation signal (V_modulation), is not activated.

Figure 7:
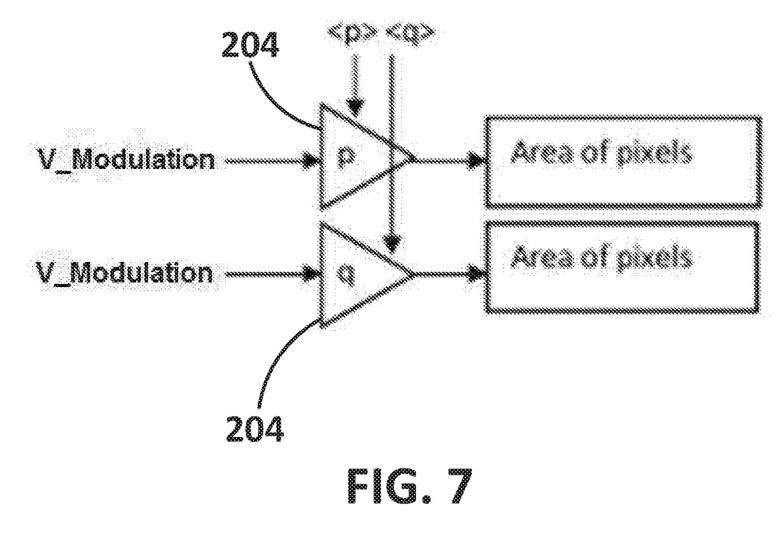
FIG. 7 is a partial schematic diagram of a light source array according to some embodiments of the disclosed subject matter.

In transmission or T mode, modulation signal (V_modulation) is activated. As shown in FIG. 6, modulation signal (V_modulation) can be applied through an AC-coupling circuit CR in the LED itself. Alternatively, as shown in FIG. 7, modulation signal (V_modulation) can also be derived directly by utilizing an array design having intermediate buffers 204. In this case, coupling circuit CR is typically not be needed and transistor M1 is DC-biased using the driver output. In some embodiments, intermediate buffers 204 are used to apply modulation signal (V_modulation) to only certain pixel regions of light source array 102. In such case, modulation signal (V_modulation) is transmitted via intermediate buffers p and q, which lead to different areas of pixel regions that are controlled separately.

In receiver or R mode, diode J anode potential $V_A(i,j)$ is set to zero or to a negative voltage. Diode J is reverse-biased and is operated as a photodiode. Transistor M2 is turned ON by setting its gate voltage $V_g(i,j)$ to a high DC level or to the supply voltage level $(+V_{cc})$. Transistor M2 acts in this case as a common-gate amplifier-receiver and presents low impedance to diode J given by 1/gm, where gm is the small signal transconductance of transistor M2. Transistor M1 is kept in ON-state and its DC current biases transistor M2. The photo-current generated by diode J goes through transistor M2 and is converted to voltage through a load resistor RL. In R mode, the modulation input is not activated.

Figure 8:
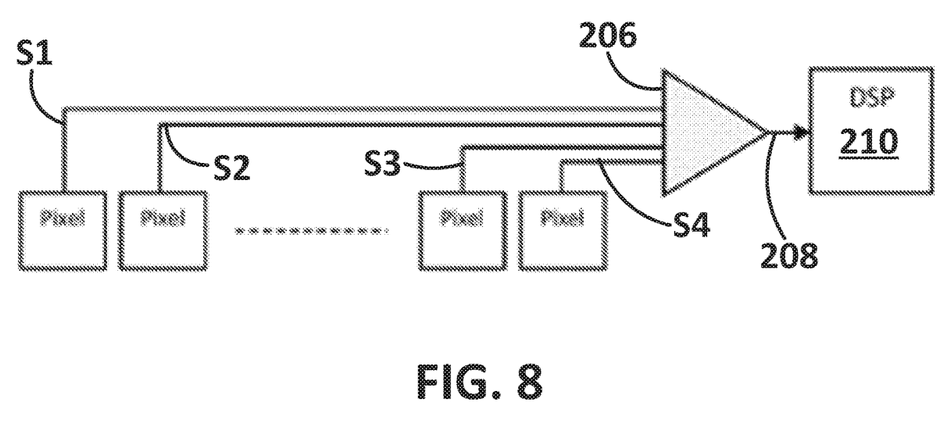
FIG. 8 is a partial schematic diagram of a light source array according to some embodiments of the disclosed subject matter.

Referring now to FIG. 8, the array design is typically configured so that a collection of the output signals S1, S2, S3, S4, etc., from all the pixels in R mode are directed to a common node 206, e.g., a voltage combiner and buffer, to apply combined signal 208 to a digital-signal-processing (DSP) function 210. In FIG. 8, each pixel is locally loaded with a resistor RL (as shown in FIG. 6) and its output $R_x$ is a voltage signal. As shown in FIG. 8, the different voltage signals S1, S2, S3, S4, from the whole array are separately routed towards common node 206, a single voltage combiner and buffer. While acceptable for some applications, this type of design often yields a large number of connections, increases the array size and increases the equivalent capacitance, thus limiting the available bandwidth. In addition, the voltage combiner and buffer is typically complex and requires high power consumption.

Figure 9:
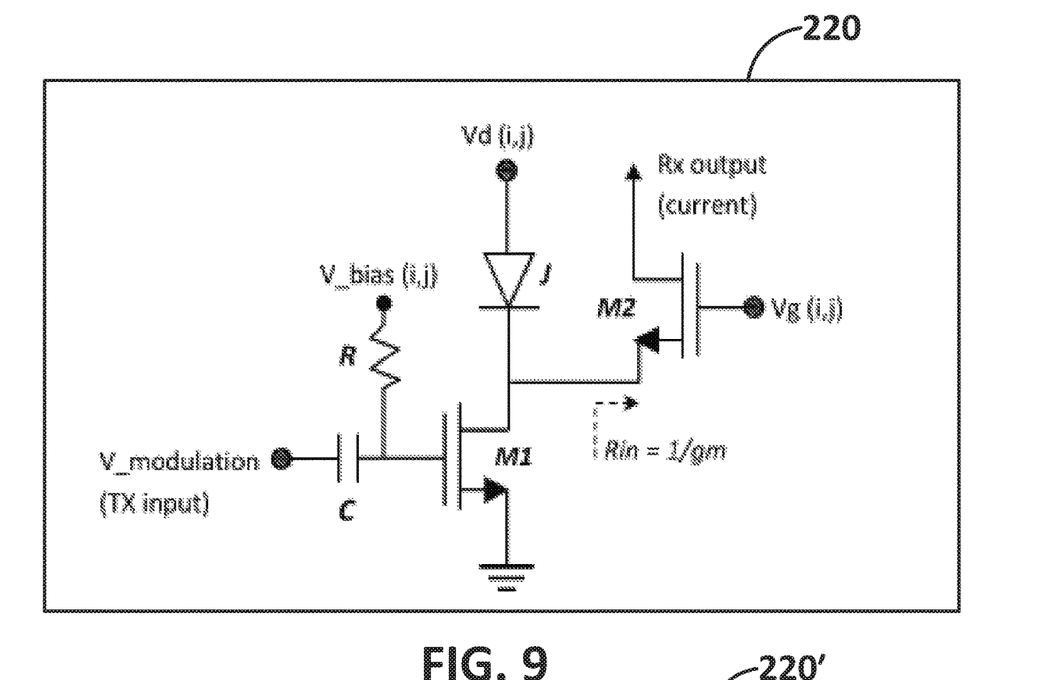
FIG. 9 is a circuit diagram of a pixel LED according to some embodiments of the disclosed subject matter.
Figure 10:
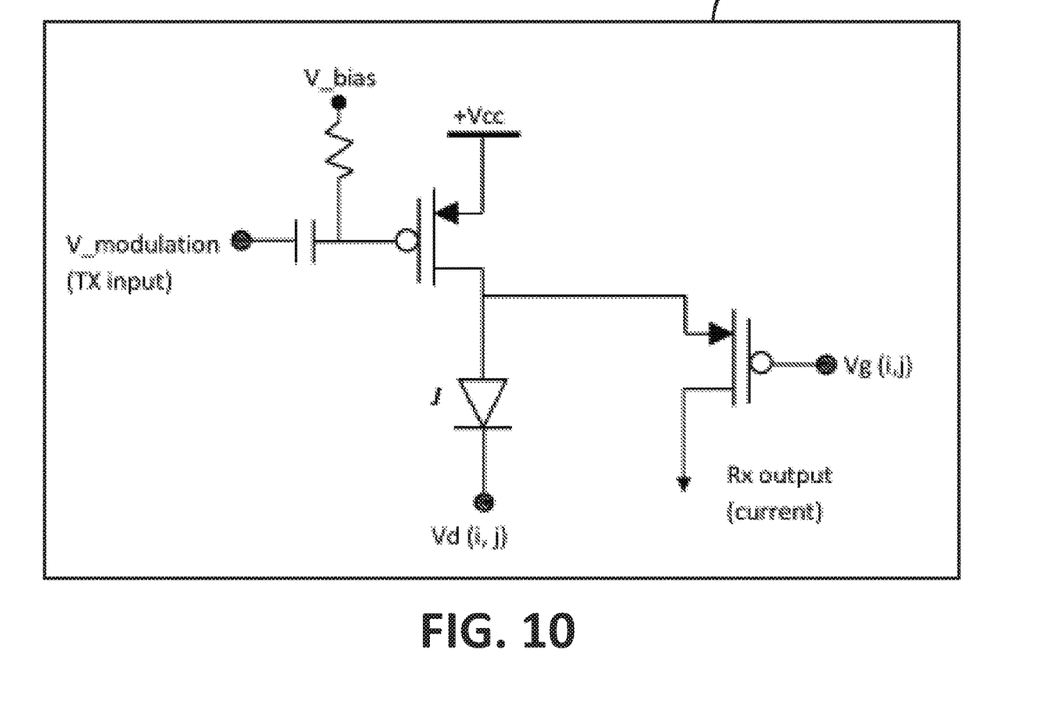
FIG. 10 is a circuit diagram of a pixel LED according to some embodiments of the disclosed subject matter.
Figure 11:
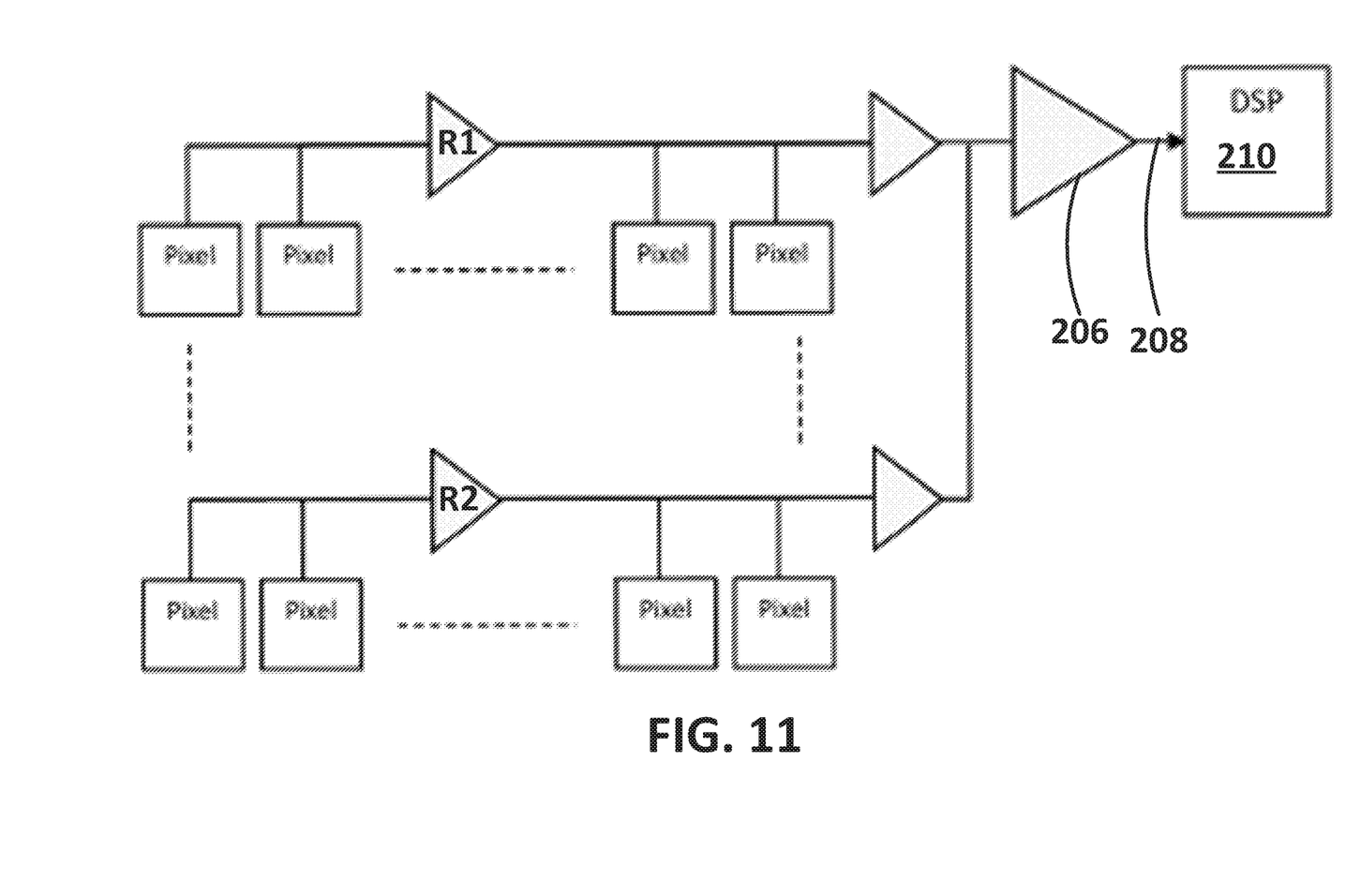
FIG. 11 is a partial schematic diagram of a light source array according to some embodiments of the disclosed subject matter.

Referring now to FIGS. 9-11, in some embodiments, each pixel 110 is configured to deliver a current output $R_x$ instead of a voltage output. In such a configuration, circuit design 200, which is shown in FIG. 6, is modified by removing load resistor RL, thus yielding a circuit design 220. In some embodiments, LEDs having a circuit design 220 include a minimum number of transistors, e.g., two transistors, M1 and M2, to form each of pixels 110. While FIG. 10 shows circuit design 220 including two N-type transistors, as shown in FIG. 11, an equivalent circuit design 220', which includes two P-type transistors, may also be used. In configurations using current output, the signal transmission from the array pixels is a modulated current as opposed to a modulated voltage. The signal collection and combination is more convenient than using voltage combination, since adding up currents would just require joined connections. In addition, current combiners and buffers present lower power consumption and less complex design techniques than using voltage combiners and buffers.

Referring now to FIG. 11, when using current output, the array design often includes intermediate (current-to-current) buffers or repeaters R1, R2, at different levels of the array in order to reduce the equivalent capacitance present on long connections and increase the available bandwidth. Also, the different connections between the pixels and the combiners and buffers are wires, shielded micro-strips, or impedance-matched transmission lines.

Figure 12:
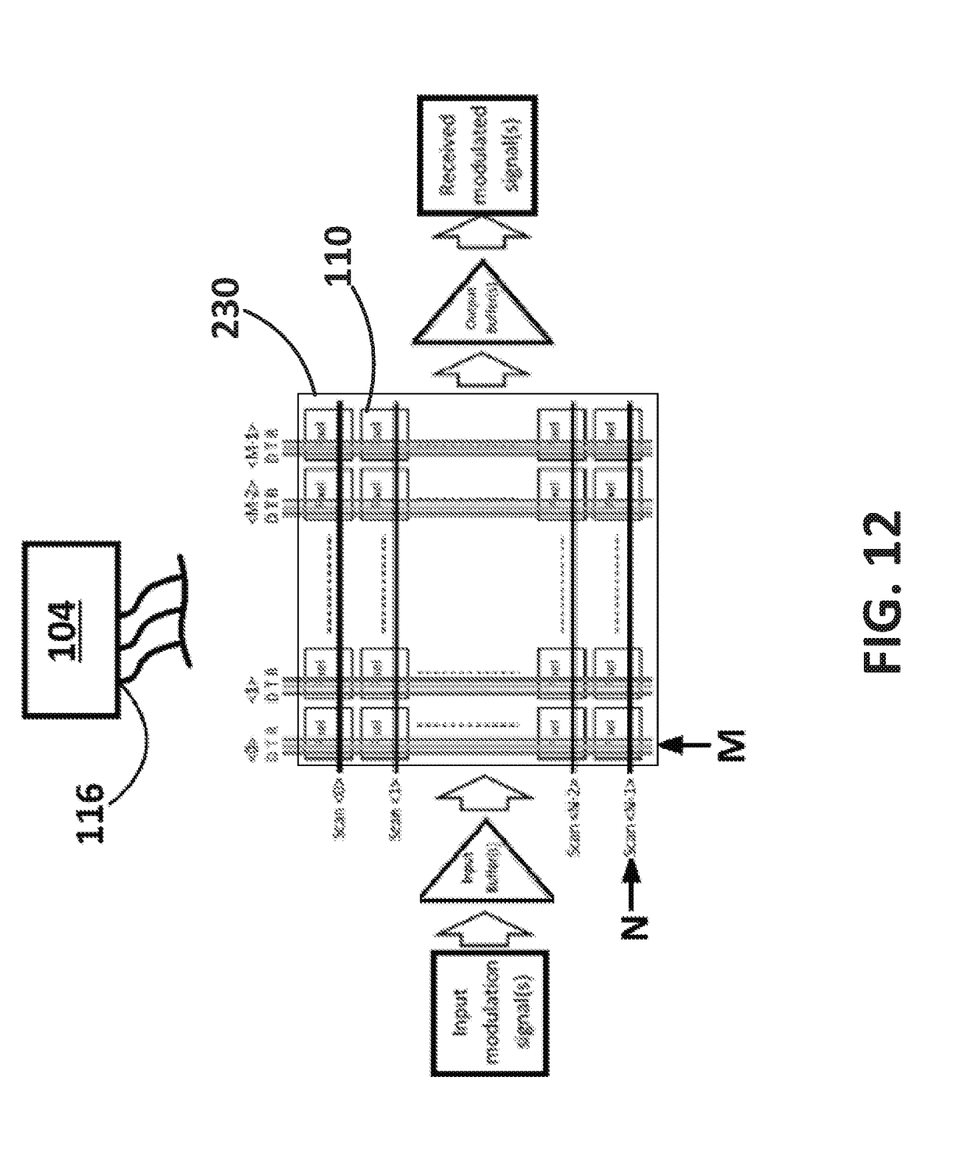
FIG. 12 is a schematic diagram of methods and devices according to some embodiments of the disclosed subject matter.
Figure 13:
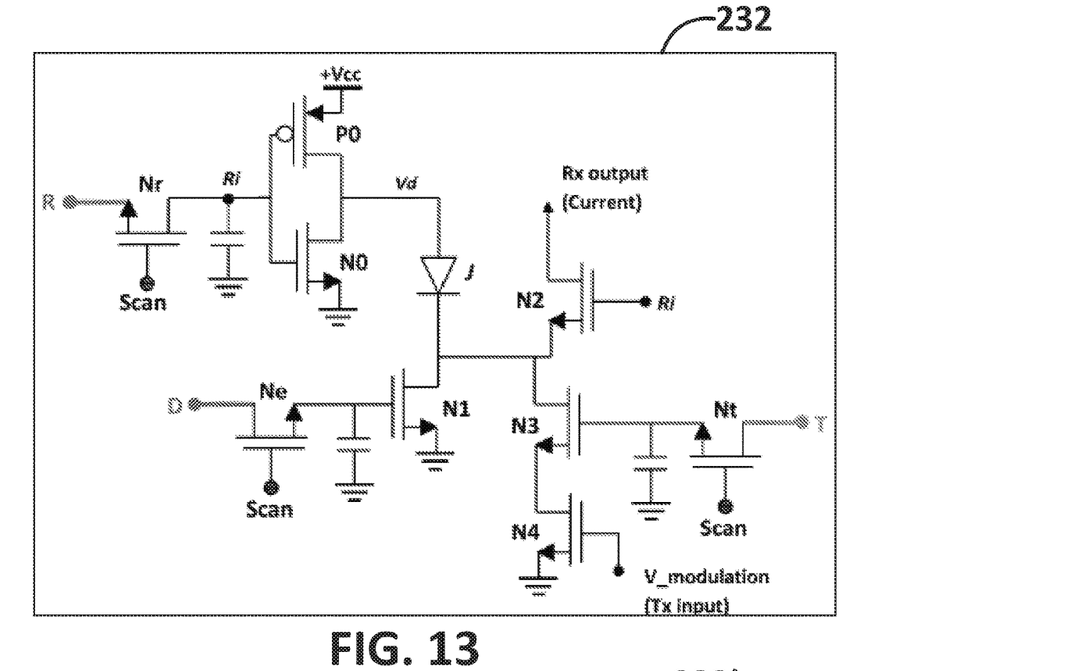
FIG. 13 is a circuit diagram of a pixel LED according to some embodiments of the disclosed subject matter.
Figure 14:
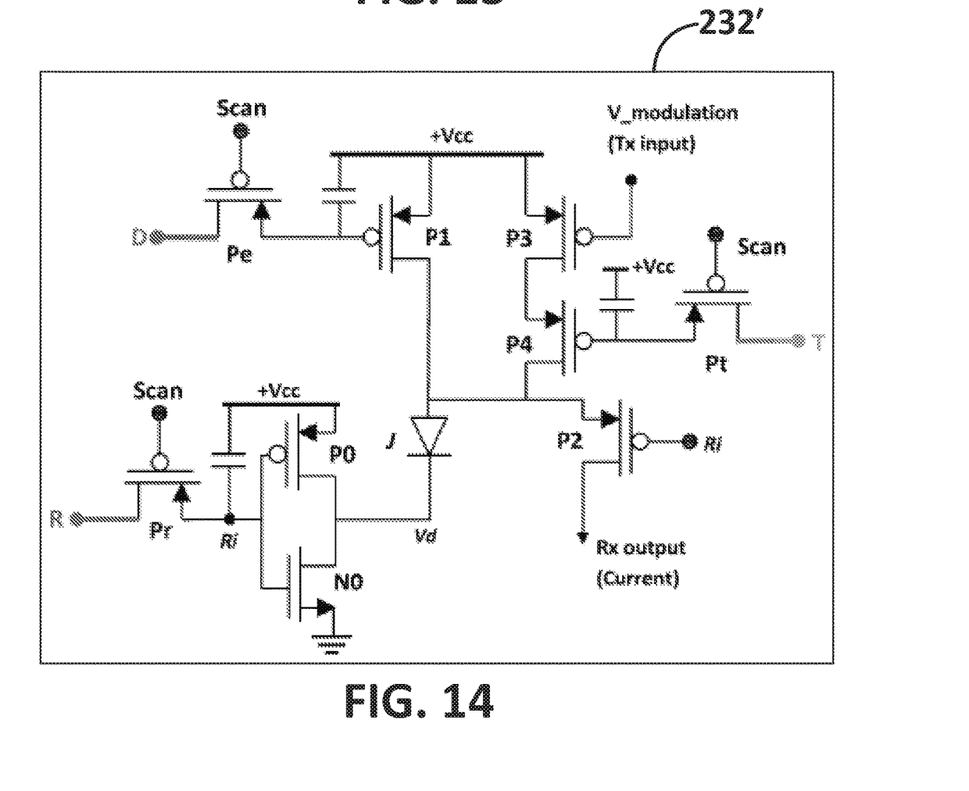
FIG. 14 is a circuit diagram of a pixel LED according to some embodiments of the disclosed subject matter.

Referring now to FIGS. 12-14, some embodiments include a light display transceiver device 224 having a light source array 230 with rows N or columns M of cooperating single pixels 110, i.e., columns of cooperating pixels are shown in FIG. 12, and using a row scanning signal Scan where control signals D, T, R are separately applied to columns. As shown in FIG. 12, signal Scan is referred to as Scan<k>, where k is an integer ranging between 0 and N−1. An auxiliary counter increments the value of the Scan<k> signal to activate the entire set of rows 0 to N−1 one after the other. When a row gets activated, the applied D, T, R values are memorized into each pixel by via respective embedded capacitors (not shown) in each pixel. Such configurations further reduce the number of control wires 106, which can be determined by the following equation (3):

$$\text{number of control wires} = N + 3M \quad (3)$$

where 3 is the number of control wires per single pixel 110, N is the number of rows, and M is the number of columns in light source array 230.

Referring now to FIGS. 13 and 14, when using row or column scanning configurations, each of pixels 110 includes a circuit design 232 and 232', respectively, which have a plurality of transistors and capacitors. FIG. 13 shows the use of primarily N-type transistors N while FIG. 14 shows the use of primarily P-type transistors P. In both FIGS. 13 and 14, control signal storage capacitors are elements D, T, R for storing respective control signals and the signal output from the array pixels is a current output. Since the mode of each pixel 110 can be set separately and individually, i.e., as D, T, or R, light source array 230 can be operated in any duplex mode, e.g., FSDD, HSDD, or TDD. FIGS. 13 and 14 are exemplary. Other configurations offering similar functionality are contemplated.

Because light source array 230 is a programmable array, it requires a higher number of transistors than previously disclosed embodiments. This is mainly due to the use of pass-gate transistors, the utilization of memory-capacitors to store the D, T, R control signals settings without being able to use these nodes to apply modulated signals, the necessity to have a parallel path for the modulation signal in T mode, i.e., transistors N3, N4 in FIG. 13 or P3, P4 in FIG. 14, and the need to provide local a low-impedance node for diode J, which is made with inverters N0, P0 in FIGS. 13 and 14, respectively.

Figure 15:
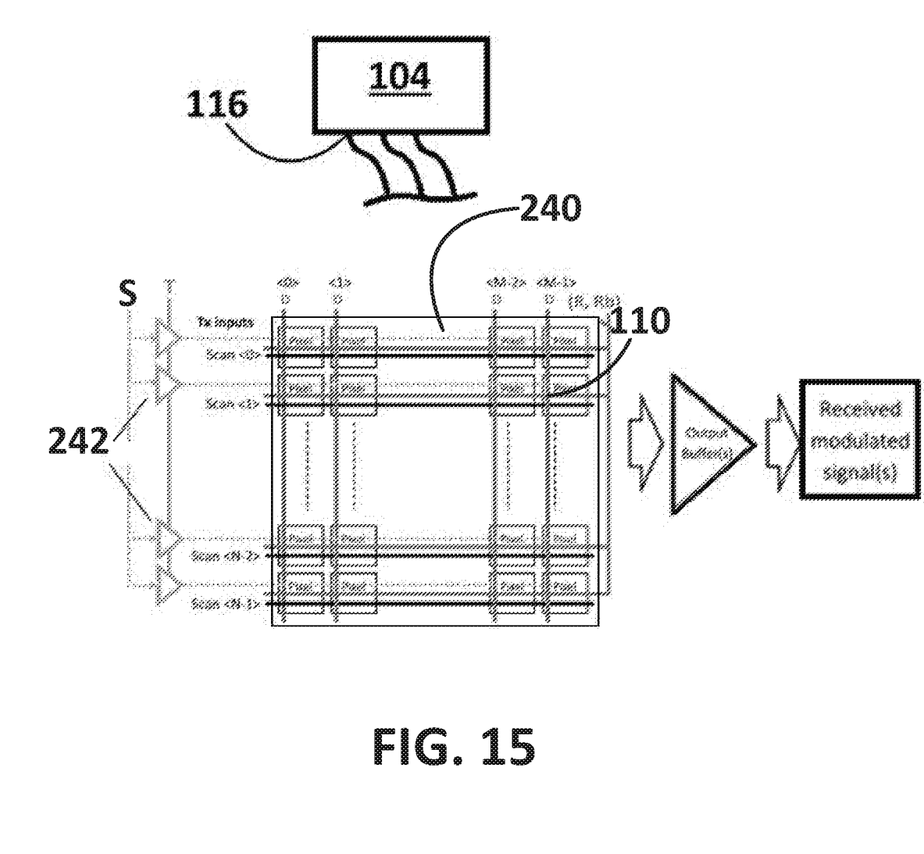
FIG. 15 is a schematic diagram of methods and devices according to some embodiments of the disclosed subject matter.
Figure 16:
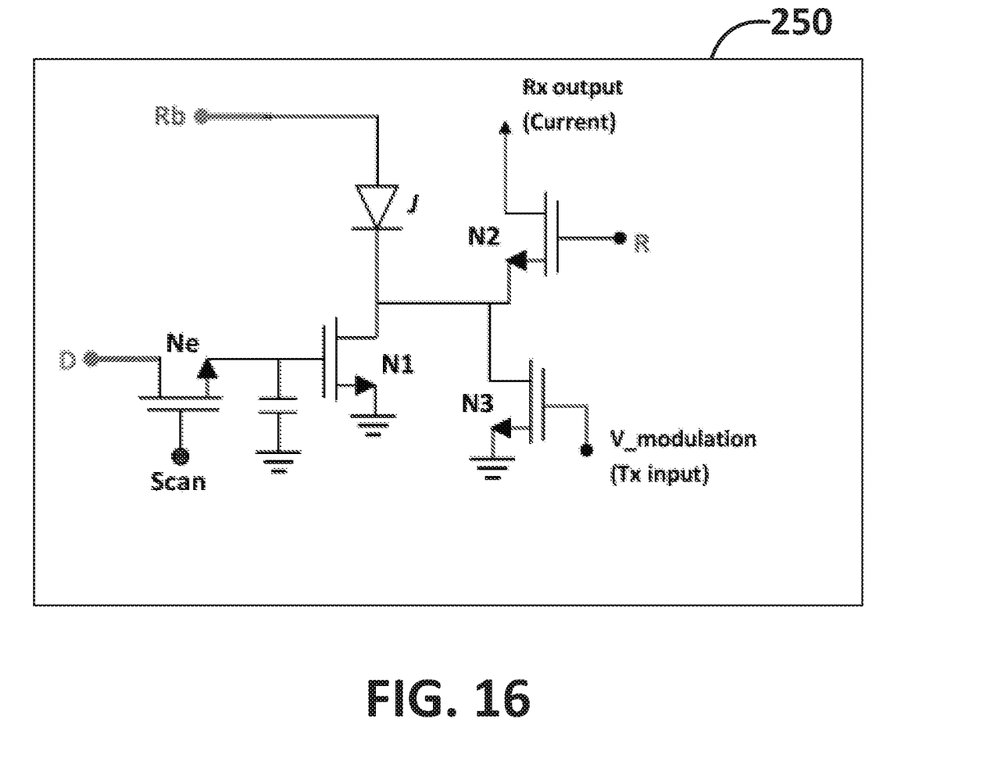
FIG. 16 is a circuit diagram of a pixel LED according to some embodiments of the disclosed subject matter.

Referring now to FIGS. 15 and 16, some embodiments include a light source array 240 including scanning that operates in only TDD mode. As a result, no scanning is needed for the R and T modes, as these modes become common to the complete array. Only the D control signal, used to enable each pixel 110 in one of the D, T, R modes is scanned. Furthermore, in T mode, each pixel 110 does not have to receive the T control signal. As shown in FIG. 15, the T mode can be activated or deactivated at the level of intermediate buffers 242 delivering the modulation signal S.

Referring now to FIG. 16, in some embodiments, each pixel 110 in light source array 240 has a circuit design 250 that includes four transistors, Ne, N1, N2, N3. In circuit design 250, each pixel 110 receives an R control signal and its digitally inverted signal $R_b$. Since signal $R_b$ carries current when diode J is forward-biased, in some embodiments and as shown in FIG. 15, it is buffered locally, at intermediate levels, or at the source level.

Figure 17:
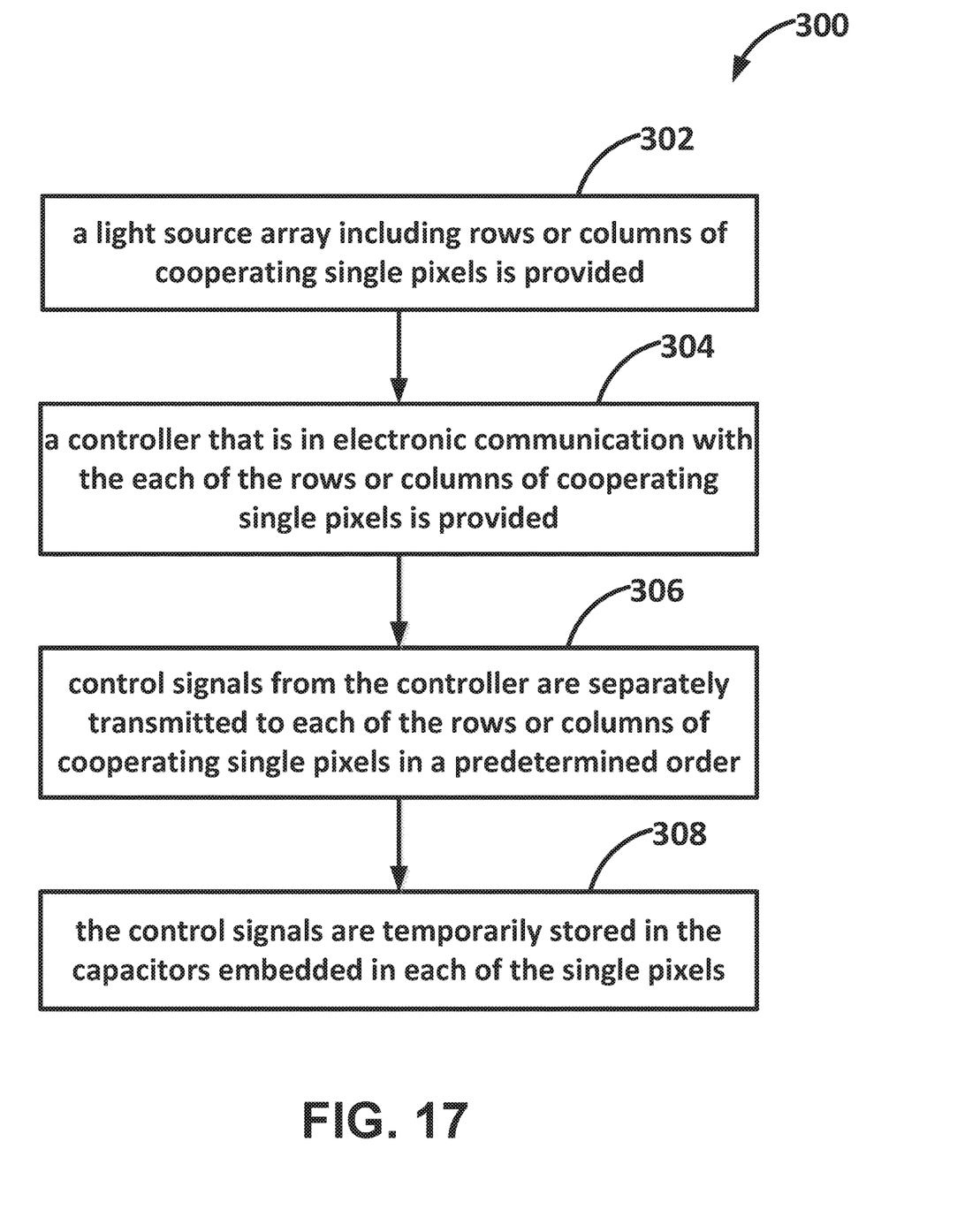
FIG. 17 is a chart of a method according to some embodiments of the disclosed subject matter.

Referring now to FIG. 17, some embodiments include a method 300 of controlling a light source array. In some embodiments, each of the single pixels includes a plurality of transistors and capacitors. At 302, a light source array including rows or columns of cooperating single pixels is provided. At 304, a controller that is in electronic communication with the each of the rows or columns of cooperating single pixels is provided. At 306, control signals from the controller are separately transmitted to each of the rows or columns of cooperating single pixels in a predetermined order. At 308, the control signals are temporarily stored in the capacitors embedded in each of the single pixels.

Devices and methods according to the disclosed subject matter offer benefits over known technologies. Devices according the disclosed subject matter may be used as both a display and for light-based communication functions either in data transmission or receiving modes. Devices and method according to the disclosed subject matter include a compact and portable device with a minimum number of utilized transistors to implement the programmable data transmission and receiving capabilities. Some embodiments include an LED display transceiver that, depending on the LED device size, is used in mobile displays or large LED stationary displays, and LED televisions where the LED emitter and receiver size vary with the application.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A light display transceiver device comprising:
   a light source array including at least one pixel unit, said at least one pixel unit including one of a single pixel, a plurality of groups of cooperating single pixels, a combination of singles pixels and groups of cooperating single pixels, and a single group of cooperating single pixels;
   control wires joined with each of said at least one pixel units; and
   a controller joined with said control wires for controlling each of said at least one pixel unit;
   wherein said light source array is configured to operate in at least one of three modes, a full-space-division-duplex (FSDD) mode, a half-space-division-duplex (HSDD) mode, and a time-division-duplex (TDD) mode and said controller causes said light source array to operate in one of said three modes; and
   wherein said control wires are a conduit for relaying a first control signal from said controller to each of said pixel units in said light source array including instructions that cause each of said pixel units to operate in a display mode, a second control signal from said controller to each of said pixel units in said light source array including instructions that cause each of said pixel units to operate in a transmitter mode, a third control signal from said controller to each of said pixel units in said light source array including instructions that cause each of said pixel units to operate in a receiver mode, or a combination thereof.

2. The device according to claim 1, wherein each of said single pixels is a light emitting diode (LED) or an organic light emitting diode (OLED).

3. The device according to claim 2, wherein each of said single pixels includes at least two transistors and signals received by said pixel are output as a voltage signal.

4. The device according to claim 2, wherein each of said single pixels includes at least two transistors and signals received by said pixel are output as a current signal.

5. The device according to claim 2, wherein each of said single pixels includes a plurality of transistors and capacitors.

6. The device according to claim 5, wherein each of said single pixels and said light source array are configured to operate in only TDD mode.

7. The device according to claim 1, further comprising intermediate buffer circuitry positioned between said controller and said light source array for controlling modulation signal application to said light source array.

8. The device according to claim 1, wherein a number of said control wires joined with said light source array is one of three times the number of rows (N) times the number of columns (M) in said light source array, three-halves NM, or N+3M.

9. A light display transceiver device comprising:
   a light source array including rows or columns of cooperating single pixels;
   control wires joined with each of said rows or columns of cooperating single pixels; and
   a controller joined with said control wires for controlling each of said rows or columns of cooperating single pixels;
   wherein said light source array includes at least one of three modes of operation, a full-space-division-duplex (FSDD) mode, a half-space-division-duplex (HSDD) mode, and a time-division-duplex (TDD) mode and said controller causes said light source array to operate in one of said modes; and
   wherein said control wires are a conduit for relaying a first control signal from said controller to said single pixels in said light source array including instructions that cause said single pixels to operate in a display mode, a second control signal from said controller to said single pixels in said light source array including instructions that cause said single pixels to operate in a transmitter mode, a third control signal from said controller to said single pixels in said light source array including instructions that cause said single pixels to operate in a receiver mode, or a combination thereof.

10. The device according to claim 9, wherein each of said single pixels is a light emitting diode (LED) or an organic light emitting diode (OLED).

11. The device according to claim 9, wherein said controller is configured to control each of said row or column of cooperating single pixels in a predetermined order.

12. The device according to claim 9, wherein each of said single pixels includes a plurality of transistors and capacitors.

13. The device according to claim 12, wherein each of said single pixels and said light source array are configured to operate in only TDD mode.

14. The device according to claim 9, wherein a number of said control wires joined with said light source array is about the number of rows (N) plus three times the number of columns (M) in said light source array.

15. A method of controlling a light source array comprising:
   providing a light source array including rows or columns of cooperating single pixels;
   providing a controller that is in electronic communication with each of said rows or columns of cooperating single pixels via control wires joined with said controller and each of said rows or columns of cooperating single pixels; and separately transmitting control signals from said controller to each of said rows or columns of cooperating single pixels in a predetermined order;
wherein a number of said control wires joined with said light source array is one of three times the number of rows (N) times the number of columns (M) in said light source array, three-halves NM, or N+3M.

16. The method according to claim 15, wherein each of said single pixels includes a plurality of transistors and capacitors.

17. The method according to claim 16, wherein said control signals only include a display mode signal and each of said single pixels and said light source array are configured to operate in only TDD mode.

18. The method according to claim 16, temporarily storing said control signals in said capacitors.

19. The method according to claim 15, wherein said control wires are a conduit for relaying a first control signal from said controller to said single pixels in said light source array including instructions that cause said single pixels to operate in a display mode, a second control signal from said controller to said single pixels in said light source array including instructions that cause said single pixels to operate in a transmitter mode, a third control signal from said controller to said single pixels in said light source array including instructions that cause said single pixels to operate in a receiver mode, or a combination thereof.

* * * * *